VEHICULAR TRANSMISSION PUMP DRIVES

Original Filed July 2, 1969 2 Sheets-Sheet 1

INVENTOR.
Edward N. Cole
BY
Ronald L. Phillips
ATTORNEY

VEHICULAR TRANSMISSION PUMP DRIVES

Original Filed July 2, 1969 2 Sheets-Sheet 2

INVENTOR.
Edward N. Cole
BY
Ronald L. Phillips
ATTORNEY

United States Patent Office

Re. 27,553
Reissued Jan. 16, 1973

27,553

VEHICULAR TRANSMISSION PUMP DRIVES

Edward N. Cole, Bloomfield Hills, Mich., assignor to General Motors Corporation, Detroit, Mich.

Original No. 3,554,056, dated Jan. 12, 1971, Ser. No. 838,549, July 2, 1969. Application for reissue Aug. 26, 1971, Ser. No. 175,413
Int. Cl. F16h *47/00, 47/04, 47/08*
U.S. Cl. 74—730 2 Claims

Matter enclosed in heavy brackets [ ] appears in the original patent but forms no part of this reissue specification; matter printed in italics indicates the additions made by reissue.

ABSTRACT OF THE DISCLOSURE

A vehicular transmission having a hydraulic pump driven by the transmission input through a one-way drive when the input is powering the transmission and driven by the transmission output through a one-way drive when the output is powering the transmission.

This invention relates to vehicular transmissions and more particularly to vehicular transmission pump drives.

In vehicular transmissions having an engine powered hydrodynamic torque converter which in turn powers range gearing, it is conventional practice to have a single hydraulic pump in the transmission continuously driven by the engine via the pump transmission input for supplying hydraulic pressure to the transmission's converter and control system. It is also conventional practice to have an additional pump driven from the transmission output and thus capable of being driven by the vehicle's driving wheels so that pressure is available when the engine is not running and the vehicle is in motion. It is especially advantageous to have this auxiliary pressure source when the pump supply is used as a pressure source for what is commonly called a central hydraulic system where, in addition to the pressure source serving the transmission, it also serves other hydraulically operated vehicular equipment such as power steering, a brake booster, an antilock brake system, windshield wiper motors, power window motors, power seat adjusters, a suspension leveling system, etc. Thus, when the engine driven pump is not in operation, such as when the engine is not running and provided the vehicle is in motion, pressure supply is available to operate the various hydraulically operated vehicular equipment.

Where an auxiliary pump driven by vehicle motion is added to provide an auxiliary hydraulic pressure source, there is considerable added cost in addition to the engineering and manufacturing problems presented in attempting to provide a compact arrangement, bearing in mind that it is advantageous to have these pumps share the same reservoir. I have found that the advantages of such a two-pump arrangement are gained by having a single pump which is driven by the transmission input and thus the engine when the input is powering the transmission and is driven by the transmission output when the output and thus the vehicle's driving wheels are powering the transmission.

The preferred embodiment of the present invention is illustrated in a vehicular transmission comprising a hydrodynamic torque converter powered by the engine driven transmission input. The converter normally powers gearing which is operable to selectively establish different speed ratio drives between the converter and the transmission output. A single hydraulic pump providing a single hydraulic pressure source is arranged between the converter and the gearing. Drive is available to the hydraulic pump through either one of two separate drives.

One of these pump drives is provided by a series arranged one-way clutch and gear drive between the input driven converter housing and the hydraulic pump so that the pump is driven by the transmission input when the engine is powering the transmission. The other pump drive is an auxiliary drive for providing drive from the transmission output to the pump. This auxiliary drive is provided by a series arranged one-way clutch and gear drive between the converter output which is the input to the transmission gearing and the hydraulic pump. This auxiliary drive provides for the hydraulic pump being driven by the transmission output when the vehicle's driving wheels are powering the transmission gearing with any one of the transmission's drives engaged.

An object of the present invention is to provide a new and improved vehicular transmission pump drive arrangement.

Another object is to provide in a vehicular transmission a hydraulic pump which is driven by the transmission input when the input is powering the transmission and driven by the transmission output when the output is powering the transmission.

Another object is to provide in a vehicular transmission having a hydrodynamic torque converter and gearing, a single hydraulic pump which is arranged between the converter and gearing and is driven by the transmission input when the input is powering the transmission and is driven by the transmission output when the output is powering the transmission.

Another object is to provide in a vehicular transmission a hydraulic pump having a one-way drive from both the transmission input and the transmission output.

Another object is to provide in a vehicular transmission having a transmission input driven hydrodynamic torque converter powering gearing which is operable to establish different gear ratio drives between the converter and the transmission ouput, a hydraulic pump having a one-way drive from both the transmission input and the converter input to the gearing.

These and other objects of the present invention will be more apparent from the following description and drawing in which.

Figure 1:
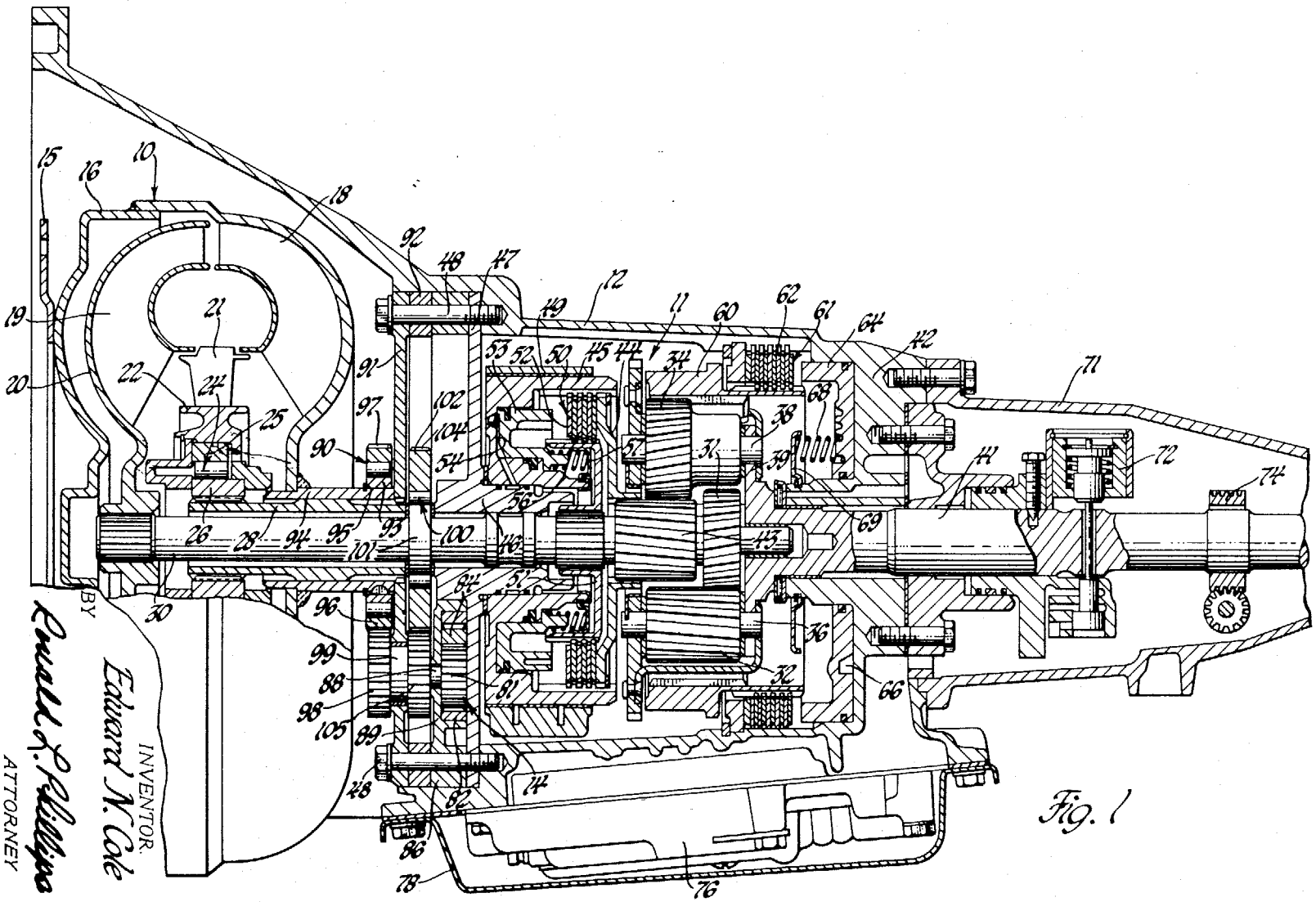
FIG. 1 is a longitudinal sectional view of a vehicular transmission embodying the pump drives of the present invention.

Referring to the drawing, FIG. 1 illustrates the invention in a vehicular transmission generally comprising a hydrodynamic torque converter 10 and planetary type range gearing 11 housed in a transmission housing 12. This converter and range gearing arrangement is operable to provide two forward speed range drives and a reverse speed range drive with the pump drives according to the present invention providing for powering a hydraulic pump 14 when the transmission input is powering the transmission and also when the transmission output is powering the transmission with one of the transmission drives engaged.

Describing first the transmission drive train arrangement, input to the transmission is delivered via a flange 15 which has provisions for being connected via a flywheel to the crankshaft of the vehicle's engine. Flange 15 is welded to a drum 16 which acts as a container for converter 10. The drum 16 carries a plurality of blades 18 providing the converter's impeller. The impeller blades 18 pump fluid to a plurality of blades 19 providing the converter's turbine, the turbine blades being carried by a shell 20. A plurality of blades 21 located between the exits of turbine blades 19 and entrances of impeller blades 18 are carried by a hub 22 and provide the converter's stator. A one-way brake 24 has its outer race or cam member 25 secured to stator hub 22 and has its inner race member 26 splined to a stationary sleeve shaft 28, the sleeve shaft 28 being made stationary by connection to the transmission housing 12 as described in more detail later. The one-way brake 24 permits free rotation of the stator in the same direction as the impeller and thus the engine crankshaft which direction will be called the forward direction and prevents reverse rotation of the stator. The converter, being a three element torque converter of the conventional design, provides torque multiplication up to the converter's coupling point and fluid coupling operation thereafter.

Input to range gearing 12 is from the converter's turbine whose shell 20 is splined to the forward end of a turbine or converter output shaft 30. The converter output shaft 30 extends freely through stationary shaft 28 to the range gearing where it is splined to a sun gear 31. Sun gear 31 meshes with a long pinion 32 which meshes with a short pinion 34. The long pinion 32 and short pinion 34 are mounted for rotation on pinion shafts 36 and 38, respectively, which are fixed to a carrier 39. Carrier 39 is integral wtih the transmission's output shaft 41 which is journaled in the rear end 42 of the transmission housing, the rear end of converter output shaft 30 being piloted in the forward end of output shaft 41. The short pinion 34 meshes with an annular sun gear 43 through which the converter output shaft 30 freely extends. Sun gear 43 is splined to the hub of a plate 44 which is splined at its outer radius to a drum 45. The drum 45 is supported for rotation on a sleeve 46 having a flange 47 secured by bolts 48 to the transmission housing 12. The drum 45 and connected sun gear [35] *43* may be braked by engagement of a hydraulically operated band brake 49.

A clutch 50 operable to clutch the sun gear 43 to the range gearing input comprises a clutch hub 51 which is splined to the converter output shaft 30. A plurality of friction plates 52 with alternate plates splined to clutch hub 51 and intermediate plates splined to drum 45 are adapted to be engaged to provide the clutch connection. The friction plates 52 are engaged by a hydraulic motor comprising a piston 53 which forms with drum 45 a motor chamber 54 adapted to receive fluid. Release springs 56 seated at one end on a spring seat 57 mounted on drum 45 and at the other end on piston 53 normally biases the piston towards its clutch release position shown. When hydraulic pressure is admitted to chamber 54 the piston 53 advances to engage the clutch.

The short pinion 34 mesh with a ring gear 60 which may be held by a brake 61. The brake 61 comprises a plurality of friction plates 62, alternate plates being splined to transmission housing 12 and intermediate plates being splined to ring gear 60. A hydraulic motor adapted to engage plates 62 comprises a piston 64 which forms with the transmission housing's rear end 42 a motor chamber 66 adapted to receive fluid. Release springs 68 seated at one end on a spring seat 69 carried on the transmission housing's rear end 42 and seated at the other end on piston 64 biases the piston towards its release position shown. On admission of hydraulic pressure to chamber 66 the piston 64 advances to engage the brake.

An extension housing 71 bolted to the rear end of the converter-gearing housing 12 houses both a transmission governor 72 and a speedometer drive 74. These devices, which are driven by the transmission output shaft 41, are conventional structures. The transmission output shaft 41 in the vehicle installation is drivingly connected by a propeller shaft assembly and differential to the vehicle's driving wheels.

The hydraulically actuated friction drive establishing devices may be either manually controlled and/or automatically controlled by a hydraulic control system whose valving is contained in a valve body 76 located in a sump 78, the valve body and sump being secured to the underside of the transmission housing 12. This hydraulic control system may be of any suitable conventional type and for automatic operation would use governor 72.

Describing now the transmission operation that is available, when all of the friction drive establishing devices are released the transmission is in neutral and no drive is transmitted to transmission output shaft 41. When only band brake 49 is engaged and with sun gear 31 driven forwardly by converter output shaft 30, drive is transmitted from sun gear 31 through long pinion 32 to short pinion 34 which is in mesh with sun gear 43. Since sun gear 43 is held stationary, short pinion 34 orbits forwardly around sun gear 43 to drive carrier 39 and connected transmission output shaft 41 in the same direction as converter output shaft 30 (the forward direction) but at a reduced speed. This provides a low speed range forward drive between the transmission's input and output.

When only clutch 50 is engaged, sun gear 43 is locked to converter output shaft 30 and thus the range gearing is locked to provide a direct drive or 1:1 speed ratio between converter output shaft 30 and transmission output shaft 41. This provides a high speed range forward drive between the transmission's input and output.

When only brake 61 is engaged, drive is transmitted from the converter driven sun gear 31 via long pinion 32 to short pinion 34. Since short pinion 34 is meshed with ring gear 60 which is being held, the short pinion 34 walks around the ring gear in the reverse direction. This causes carrier 39 and connected transmission output shaft 41 to turn in the reverse direction but at a reduced speed with respect to the converter output shaft 30 to provide a reverse drive between the transmission's input and output.

According to the present invention, the single hydraulic pump 14 provides the hydraulic pressure source for operating the transmission and this pressure source may also be used to supply the vehicle's other hydraulically operated equipment. The hydraulic pump 14 is arranged between the converter 10 and range gearing 11 and below the transmission's centerline close to sump 78. Referring to both FIGS. 1 and 2, the hydraulic pump 14 is an internal-external gear type comprising an externally toothed drive gear 81 eccentrically arranged within and in mesh with an internally toothed driven gear 82, there being a crescent 84 arranged intermediate these gears diametrically opposite the place where they mesh. The pump 14 is suitably ported to receive fluid from the transmission sump 78 on its intake side and with the drive gear 81 supplied with power, it turns to drive the driven gear 82 to provide pumping action to deliver the intake fluid at pressure to suitable porting for delivery to operate the transmission and other hydraulically operated vehicular equipment. The front side of flange 47 provides a face plate for the pump's gears which, together with crescent 84, are supported by a pump housing 86, the pump housing being secured by the bolts 48 to the front side of flange 47. The pump's drive gear 81 is keyed to a drive shaft 88 extending parallel to the transmission's longitudinal central axis, shaft 88 being journaled in the front side 89 of pump housing 86.

Figure 2:
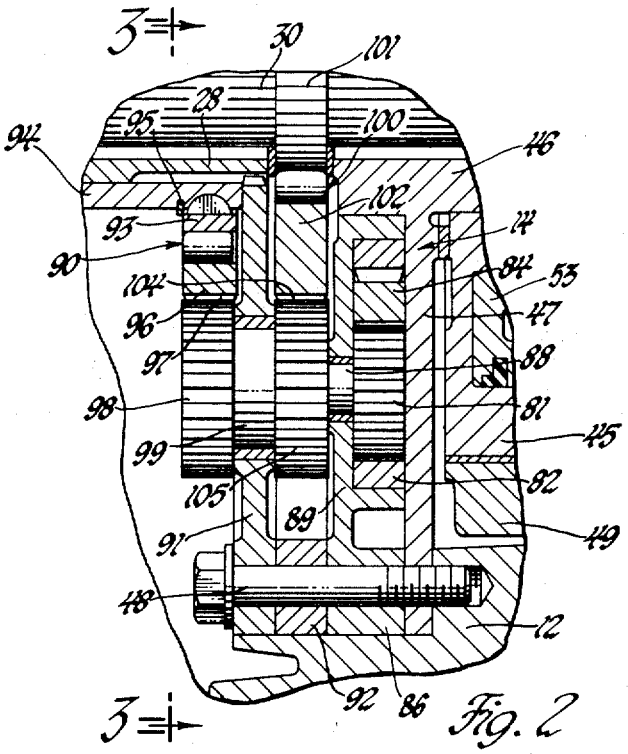
FIG. 2 is an enlarged view of the pump drives shown in FIG. 1.
Figure 3:
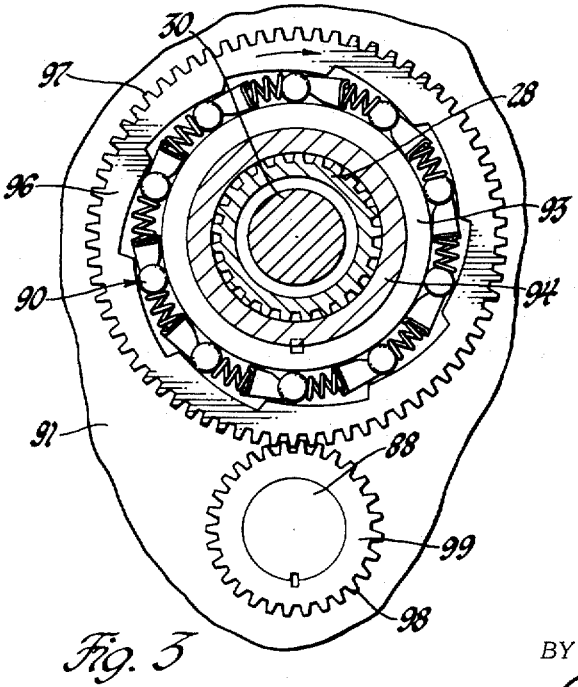
FIG. 3 is a view taken on line 3—3 of FIG. 2.

Two pump drives are provided for driving the hydraulic pump's drive shaft 88. One of these pump drives provides a one-way drive from the transmission input to the pump and the other provides a one-way drive from the transmission output to the pump. The one-way pump drive from the transmission input comprises a one-way clutch 90 arranged between converter 10 and a web 91 which is spaced from the forward side of pump housing 86 by a spacer ring 92, web 91 and ring 92 being secured to the transmission housing 12 by bolts 48. The converter stator's sleeve shaft 28 extends through sleeve shaft 94 and is splined at its rear end to the center of web 91 to provide reaction to the converter's one-way brake 24. As shown in FIGS. 1, 2 and 3, the one-way clutch 90 has an inner race 93 keyed to the rear end of a sleeve shaft 94, shaft 94 being welded at its front end to the rear side of converter drum 16. The inner race 93 of one-way clutch 90 is prevented from movement away from web 91 by a retainer ring 95. The outer race or cam ring 96 of one-way clutch 90 has external teeth 97 formed thereon meshing with teeth 98 of a cluster gear 99 which is journaled in web 91 and keyed to the pump's drive shaft 88. The one-way clutch 90 permits free forward rotation of the outer race 96 as indicated by the directional arrow in FIG. 3 relative to the inner race 93 and connected transmission input and prevents reverse rotation relative thereto.

The one-way pump drive from the transmission output as shown in FIGS. 1 and 2 comprises a one-way clutch 100 trapped on one side by web 91 and the rear end of sleeve shaft 94 and trapped on the other side by sleeve 46. The one-way clutch 100 has an inner race 101 keyed to an intermediate portion of converter output shaft 30. The outer race or cam ring 102 of one-way clutch 100 has external teeth 104 formed thereon in mesh with teeth 105 of cluster gear 99. The one-way clutch 100 permits free forward rotation of outer race 102 relative to the inner race 101 and connected converter output shaft 30 and prevents reverse rotation relative thereto.

The two pump drive gear trains 97–98 and 104–105, preferably have the same gear ratio. The one-way clutches 90 and 100 are conventional and may be of either the roller type as best shown in FIG. 2 or of the sprag type.

With this pump drive arrangement, the hydraulic pump 14 is normally driven through the one-way clutch 90 since the vehicle's engine is normally powering the transmission, recognizing that the converter output shaft 30 in this condition will always be rotating at a speed less than the transmission input. Since the transmission input is overrunning the converter output shaft 30, the other one-way clutch 100 overruns.

On the other hand, when the vehicle is in motion but the vehicle engine is not powering the transmission and with a transmission drive engaged, power is delivered from the vehicle's driving wheels to the converter output shaft 30 via the range gearing 11. In both the low speed and reverse speed transmission drive, the converter output shaft 30 will turn faster than the transmission output shaft 41 since in the reverse power flow direction these drives effect overdrive speed ratios, i.e. reciprocals of their reduction speed ratios. In the high speed transmission drive the converter output shaft 30 turns at the same speed as the transmission output shaft 41 since there is then a 1:1 speed ratio through the gearing. Under all of these drive conditions, the converter output shaft 30 will turn forwardly relative to the transmission input and at that time the other one-way clutch 100 will engage to provide drive to the hydraulic pump 14 with the one-way clutch 90 then overrunning. Accordingly, the hydraulic pump 14 will run faster to produce more pump flow with either the low speed or reverse speed transmission drive engaged as compared with pump operation with the high speed transmission drive engaged.

Thus, the hydraulic pump 14 is driven by the transmission input when the input is powering the transmission and is driven by the transmission output when the output is powering the transmission. By having only one hydraulic pump with a drive from both the transmission input and the transmission output, the advantages of a two-pump arrangement are gained with considerable cost savings. Furthermore, the single hydraulic pump with the two pump drives provides a very compact arrangement characterized by its short axial dimension and thus minimizes the overall transmission length.

The above described preferred embodiment is illustrative of the invention which may be modified within the scope of the appended claims.

I claim:

[1. In a vehicular transmission the combination of a transmission input member; a transmission output member; variable ratio drive means for drivingly connecting said transmission input member to said transmission output member; a hydraulic pump; drive means for normally drivingly connecting said transmission input member to said pump when said transmission input member is powering said variable ratio drive means; and additional drive means for drivingly connecting said transmission output member to said pump only when said transmission output member is powering said variable ratio drive means.]

[2. In a vehicular transmission the combination of a transmission input member; a transmission output member; variable ratio drive means for drivingly connecting said transmission input member to said transmission output member; a hydraulic pump; drive means for normally drivingly connecting said transmission input member to said pump when said transmission input member is powering said variable ratio drive means; and additional drive means for overriding said first mentioned drive means and drivingly connecting said transmission output member to said pump when said transmission output member is powering said variable ratio drive means.]

[3. In a vehicular transmission the combination of a transmission input member; a transmission output member; variable ratio drive means for drivingly connecting said transmission input member to said transmission output member; said variable ratio drive means including hydrodynamic means having an impeller powered by said input member and also having a turbine; a turbine output member driven by said turbine for powering said transmission output member; a hydraulic pump; drive means for normally drivingly connecting said transmission input member to said pump when said transmission input member is powering said variable ratio drive means; and additional drive means for drivingly connecting one of said output members to said pump only when said transmission output member is powering said variable ratio drive means.]

[4. In a vehicular transmission the combination of a hydrodynamic torque converter having a converter input and a converter output; gearing means having a gearing input powered by said converter output and also having a gearing output and operable to selectively establish a plurality of different speed ratio drives between said gearing input and output; a hydraulic pump; one-way drive means for connecting said converter input to drive said pump in only one direction; and one-way drive means for connecting said gearing input to drive said pump in said one direction whereby said pump is normally driven by said converter input when said converter is powering said gearing means and is driven by said gearing input when said gearing means is establishing a speed ratio drive and is powered by said gearing output.]

[5. In a vehicular transmission the combination of an input member; an output member; a hydrodynamic torque converter powered by said input member; gear means operable to selectively establish different speed ratio drives between said converter and said output member; a hydraulic pump arranged between said converter and said gear means; pump drive means including one-way clutch means and gear means for normally establishing a one-way geared drive from said input member to said pump; and additional pump drive means including one-way clutch means and gear means for establishing a one-way geared drive from said output member through at least one of said speed ratio drives to said pump whereby said pump is driven by said input member when said input member is powering said converter and said pump is driven by said output member when said output member is powering said gear means.]

*6. In a vehicular transmission the combination of a transmission input member; a transmission output member; a hydrodynamic torque converter comprising an impeller member connected to said transmission input member, a turbine member and a reaction member located intermediate the turbine and impeller members with all of said converter members cooperating to provide a flow circuit for torque converter operation that effects on drive of said impeller member by said transmission input member drive of said turbine member at speeds*

*approaching but never exceeding impeller member speed; gear means operable to selectively establish different speed ratio drives between said turbine member and said transmission output member to connect said turbine member to drive said transmission output member for normal transmission operation wherein turbine member speed never exceeds the speed of said transmission input member and said impeller member and also to connect said transmission output member to drive said turbine member faster than the speed of said impeller member and said transmission input member; a hydraulic pump arranged between said converter and said gear means, pump drive means including one-way speed responsive clutch means arranged between said converter and said pump for drivingly connecting said transmission input member to said pump by said one-way clutch means engaging only when the speed of said transmission input member would otherwise exceed the pump speed; and additional pump drive means including one-way speed responsive clutch means arranged between said converter and said pump for drivingly connecting said transmission output member through at least one of said speed ratio drives to said pump by the last-mentioned said one-way clutch means engaging only when the speed of said turbine member when driven by said transmission output member would otherwise exceed pump speed whereby said pump is driven by said transmission input member only when said transmission input member is delivering power to said converter and said pump is driven by said transmission output member only when said transmission output member is delivering power to said gear means.*

*7. In a vehicular transmission the combination of a housing; a transmission input member rotatably supported in said housing; a transmission output member rotatably supported in said housing; a hydrodynamic torque converter within said housing and comprising an impeller member connected to said transmission input member, a turbine member and a reaction member located intermediate the turbine and impeller members with all of said converter members cooperating to provide a flow circuit for torque converter operation that effects on drive of said impeller member by said transmission input member drive of said turbine member at speeds approaching but never exceeding impeller member speed; gear means within said housing operable to selectively establish different speed ratio drives between said turbine member and said transmission output member to connect said turbine member to drive said transmission output member for normal transmission operation wherein turbine member speed never exceeds the speed of said transmission input member and said impeller member and also to connect said transmission output member to drive said turbine member faster than the speed of said impeller member and said transmission input member; a hydraulic pump within said housing and arranged between said converter and said gear means; pump drive means within said housing and arranged between said converter and said pump and including one-way speed responsive clutch means for drivingly connecting said transmission input member and said impeller member to said pump by said one-way clutch means engaging only when the speed of said transmission input member and said impeller member would otherwise exceed the pump speed; and additional pump drive means within said housing and arranged between said converter and said pump and including one-way speed responsive clutch means for drivingly connecting said transmission output member through at least one of said speed ratio drives to said pump by the last-mentioned said one-way clutch means engaging only when the speed of said turbine member when driven by said transmission output member would otherwise exceed pump speed whereby said pump is driven by said transmission input member when said transmission input member is delivering power to said converter and said pump is driven by said transmission output member only when said transmission output member is delivering power to said gear means.*

References Cited

The following references, cited by the Examiner, are of record in the patented file of this patent or the original patent.

UNITED STATES PATENTS

| | | | |
|---|---|---|---|
| 2,745,295 | 5/1956 | Burnett | 74—732 X |
| 2,749,775 | 6/1956 | Simpson | 74—731 |
| 3,038,353 | 6/1962 | Roche | 74—730 |
| 3,093,012 | 6/1963 | Place | 74—677 |
| 3,394,618 | 7/1968 | Dhonau | 74—731 |

FOREIGN PATENTS

| | | | |
|---|---|---|---|
| 737,400 | 6/1943 | Germany | 74—730 |

ARTHUR T. McKEON, Primary Examiner

U.S. Cl. X.R.

74—645, 677, 688